US009376229B2

(12) United States Patent
Belisle

(10) Patent No.: US 9,376,229 B2
(45) Date of Patent: Jun. 28, 2016

(54) CIRCULAR EXPANDABLE STATIONARY STAND-ALONE SINGLE-USE DISPOSABLE GARBAGE AND TRASH BAG HOLDER AND BAG FOR OUTSIDE ACTIVITY

(76) Inventor: William Redvers Belisle, New Orleans, LA (US)

( * ) Notice: Subject to any disclaimer, the term of this patent is extended or adjusted under 35 U.S.C. 154(b) by 0 days.

(21) Appl. No.: 13/555,714

(22) Filed: Jul. 23, 2012

(65) Prior Publication Data

US 2014/0020223 A1 Jan. 23, 2014

(51) Int. Cl.
*B23P 11/00* (2006.01)
*B65B 67/12* (2006.01)
*B65F 1/14* (2006.01)

(52) U.S. Cl.
CPC ........... *B65B 67/1205* (2013.01); *B65F 1/1415* (2013.01); *B65F 2220/106* (2013.01); *Y10T 29/49826* (2015.01)

(58) Field of Classification Search
CPC ........ B65D 37/00; B65D 15/22; B65D 33/02; B65D 7/20; B65D 7/26; B65D 2519/00164; Y10S 220/904; Y10S 220/908; D06F 95/004; B65F 1/06
USPC ......... 220/9.1, 9.2, 9.3, 9.4, 485, 490, 495.06
See application file for complete search history.

(56) References Cited

U.S. PATENT DOCUMENTS

| | | | | |
|---|---|---|---|---|
| 858,488 | A * | 7/1907 | Tynes | 220/9.2 |
| 1,278,385 | A * | 9/1918 | Rickard | 248/94 |
| 3,627,242 | A * | 12/1971 | Vandermast | 248/97 |
| 4,157,801 | A * | 6/1979 | Elmer | 248/97 |
| 4,575,895 | A * | 3/1986 | Spellman | 15/327.1 |
| 5,098,108 | A * | 3/1992 | McKinney | 273/400 |
| 5,871,037 | A * | 2/1999 | Feldt | 141/391 |
| 6,053,459 | A * | 4/2000 | Priefert et al. | 248/97 |
| 6,138,965 | A * | 10/2000 | Iorio et al. | 248/150 |
| 6,315,143 | B1 * | 11/2001 | Dotts | 220/9.2 |
| 6,830,170 | B2 * | 12/2004 | Abel | 224/634 |
| 8,070,006 | B2 * | 12/2011 | Austin | B65F 1/004 220/4.28 |
| 2002/0000501 | A1 * | 1/2002 | Linder | 248/99 |
| 2003/0106895 | A1 * | 6/2003 | Kalal | 220/9.2 |
| 2003/0183630 | A1 * | 10/2003 | Schneider et al. | 220/9.2 |
| 2007/0045326 | A1 * | 3/2007 | Tramontina et al. | 220/495.11 |
| 2007/0181753 | A1 * | 8/2007 | Herlands | 248/99 |

* cited by examiner

*Primary Examiner* — David Bryant
*Assistant Examiner* — Lee A Holly

(57) ABSTRACT

A single-use disposable method of making a circular expandable multi-plastic and aluminum ring with locking ring connectors with a bag attached to the inner parts of the rings with a cardboard base inside and outside the bag is presented. The invention includes multiple progressively larger light-weight rings held in a stable position by multiple and equidistant positioned locking connectors and connection at the bottom to a cardboard base, with a bag positioned inside and outside the ring-connector-base structure. The invention is most useful for garbage and trash disposal in picnic, camping, family reunion, barbecue, outside gatherings and outings type areas where conventional garbage and trash disposal units are not available.

Figure 1:
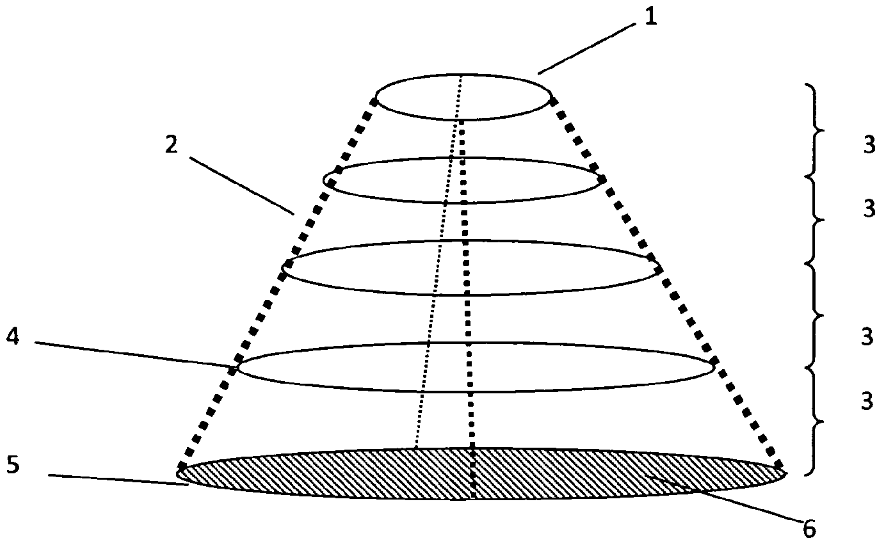

8 Claims, 5 Drawing Sheets a.

b.

CIRCULAR EXPANDABLE STATIONARY STAND-ALONE SINGLE-USE DISPOSABLE GARBAGE AND TRASH BAG HOLDER AND BAG FOR OUTSIDE ACTIVITY

CROSS-REFERENCE TO RELATED APPLICATIONS

1. Scobey, Jr.; Fred Bradley, 2012. "Trash bag apparatus and method of use" (U.S. Pat. No. 8,210,485).
2. Naujoks; Richard, 2012. "Garbage bag holder" (U.S. Pat. No. 8,201,780).
3. Blum; Alvin S., 2012. "Film bag holder" (U.S. Pat. No. 8,181,919).
4. Peterson; Carl S., 2010. "Portable bag holder employing elastic band" (U.S. Pat. No. 7,753,322).
5. Metcalfe; Donna, 2007. "Debris collecting bag and bag holder" (U.S. Pat. No. 7,237,753).
6. Chan; Edmund, 2003. "Trash bag holder" (U.S. Pat. No. 6,557,716).
7. Valesquez, Raymond, 2002. "Bag support assembly" (U.S. Pat. No. 6,491,264).
8. Scheibe, Sr.; Gary C., 2001. "Collapsible trash bag holder" (U.S. Pat. No. 6,199,802).

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention/Technical Field

The following is 'A statement of the field of art to which the invention pertains':

1. U.S. Class 248 Field of Search: 248/99; 248/907; 248/97
2. U.S. Class 248 Field of Search: 248/99; 248/100; 248/175
3. U.S. Class 248 Field of Search: 248/97; 220/495.08; 248/95
4. U.S. Class 248 Field of Search: 248/99; 248/100; 248/101; 248/95; 248/97; 294/1.3; 294/1.4; 383/13; 383/33
5. U.S. Class 248 Field of Search: 248/99; 193/15; 193/25R; 220/908.3; 248/100; 248/95; 383/12
6. U.S. Class 220 Field of Search: 220/9.4; 220/495.08; 220/495.11; 220/908.1
7. U.S. Class 248 Field of Search: 248/97
8. U.S. Class 248 Field of Search: 248/97; 248/101; 248/99

2. Description of Related Art

Scobey describes a trash bag holder with a strip looped with a catch mechanism used to hold open a trash bag to permit depositing of garbage and the circular hoop holds the bag and is attached to a vertical handle, the hoop can be removed from the handle. Naujoks describes a device used to hold a garbage bag open which uses two spaced apart depending frames arranged to revive to top of garbage bags. Naujoks also discusses "various other designs of bag holders in the prior art" including U.S. Pat. No. 1,653,393 by Cox, U.S. Pat. No. 3,905,406 by Cruse, and U.S. Pat. No. 7,066,220 by Take et al. Blum describes a removable device for holding a film bag upright during filling. Peterson describes a device with a handle and a forearm brace used for holding collapsible bags, such as a plastic trash bag. Peterson also discusses portable bag holders including Langley (U.S. Pat. No. 5,997,061), Passage (US Pat. Pub. No. 2004/0195467), and Moe (U.S. Pat. No. 5,217,271).

Metcalfe describes a debris collector that includes a sleeve forming a support structure with at least one support element. Chan describes a four-sided, open bottomed bag holding device. Valesquez describes a bag support device with pivotal and extending legs with upper or lower adjustable bag support frames and can be configured as a rigid box frame. Scheibe describes a collapsible garbage bag holder which holds a garbage bag open, includes a ring portion and a plurality of T-shaped fittings for the ring section with a plurality of legs pivotally coupled to the T-fittings for supporting the ring portion apart from the ground surface.

In many instances, activities and environments for picnics, camping, family reunions, barbecues, and other outside gatherings and outings are not equipped with convenient and conveniently located garbage and trash disposal units. The present invention attempts to provide such garbage and trash disposal units. The prior art does not describe a circular expandable stationary stand-alone single-use disposable garbage and trash bag holder and bag for outside activity as does the present invention.

BRIEF SUMMARY OF THE INVENTION

It is the objective of the invention to provide a circular single-use expandable disposable garbage bag holder and bag for convenient trash deposit in areas lacking conventional garbage disposal units including and not limited to picnics, camping, family reunions, barbecues, outside gatherings and outings. The claimed invention provides a conveniently collapsed and flat unit that can be easily be snapped or quickly expanded into a large disposable garbage holder and bag. The claimed invention is equipped with a tie-string at the top allowing the invention to be sealed and tied and the entire garbage holder and bag can be disposed of and left for appropriate trash pick-up. The claimed invention uses light-weight equidistant rings, locking joints, and connectivity to a cardboard base to maintain an upstanding garbage holder and bag.

BRIEF DESCRIPTIONS OF THE SEVERAL VIEWS OF THE DRAWINGS

The present invention will be more fully understood by references to the following brief description thereof when read in conjunction with the attached drawings, and wherein:

FIG. 1. A simple side view diagram of a five-ring single-use circular disposal garbage bag holder and bag illustrating the five rings connected by the locking connector and rings holding the bag in position and shape with the bottom of the bag positioned and connected to the cardboard base located inside and outside the bag.

Figure 2:
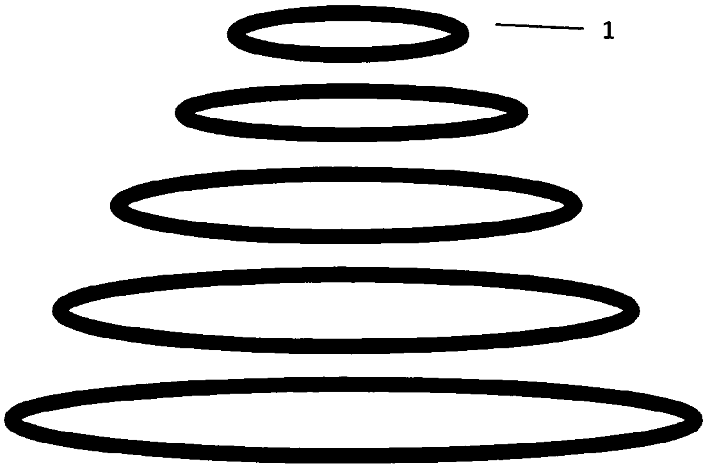

FIG. 2. A simple side view diagram of four light-weight plastic and aluminum rings of progressing size.

Figure 3:
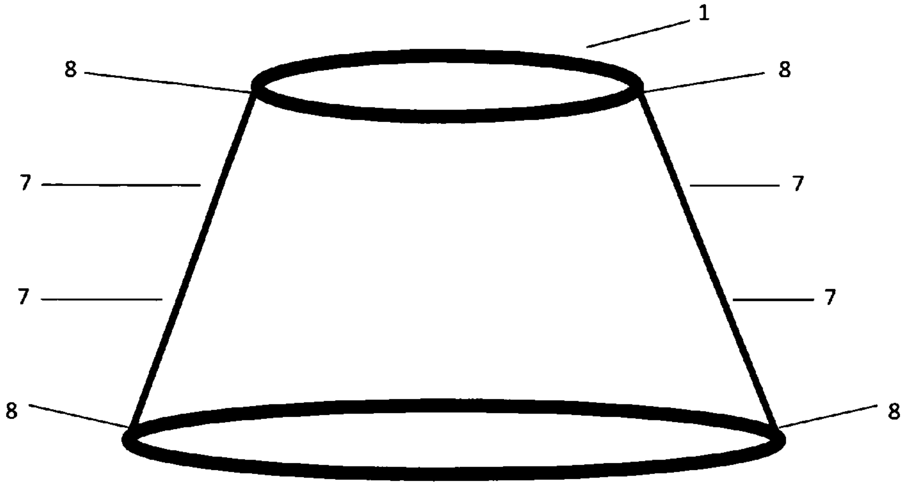

FIG. 3. A cross-sectional view of two light-weight plastic and aluminum rings illustrating the extended locking connectors, the locking joints of the connectors and the firmly connected and pivotal connection of the end of the locking connector to the upper located ring and the lower located ring.

Figure 4:
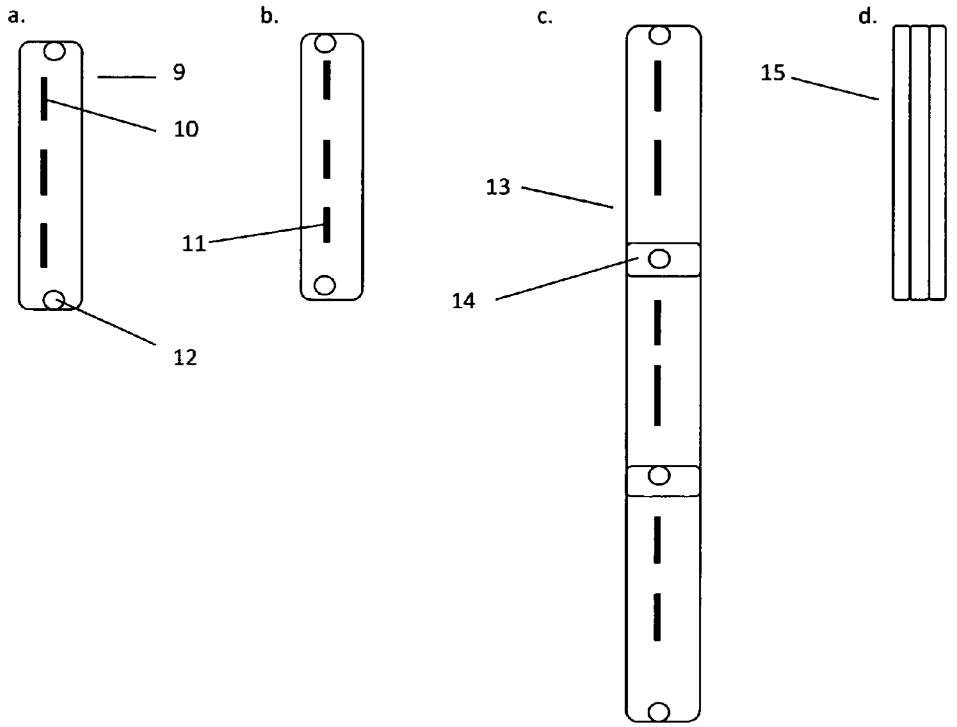

FIG. 4. A cross-sectional view of a. the top view of the lock connector, b. the bottom view of the lock connector, c. three lock connectors connected and locked into expanded position, and d. three folded, collapsed and stacked lock connectors.

Figure 5:
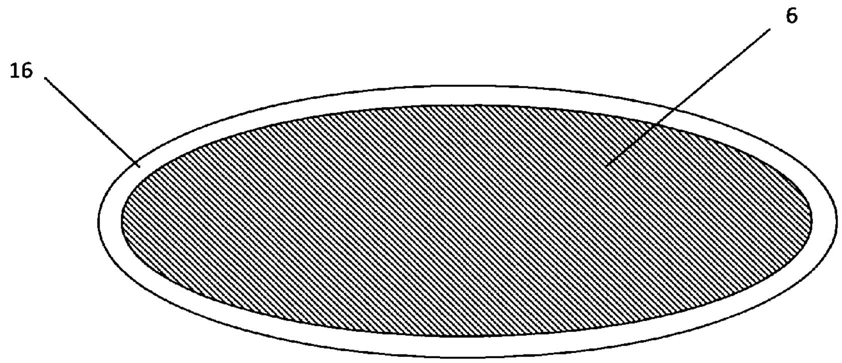

FIG. 5. A cross-sectional view of the circular cardboard base of the single-use circular disposal garbage bag holder and bag.

Figure 6:
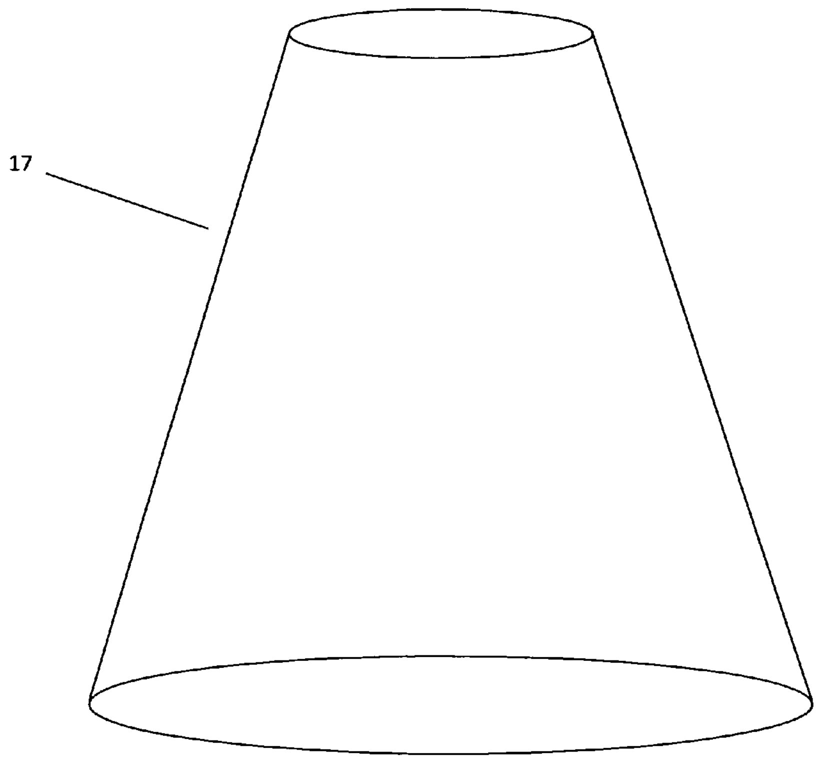
Figure 6:
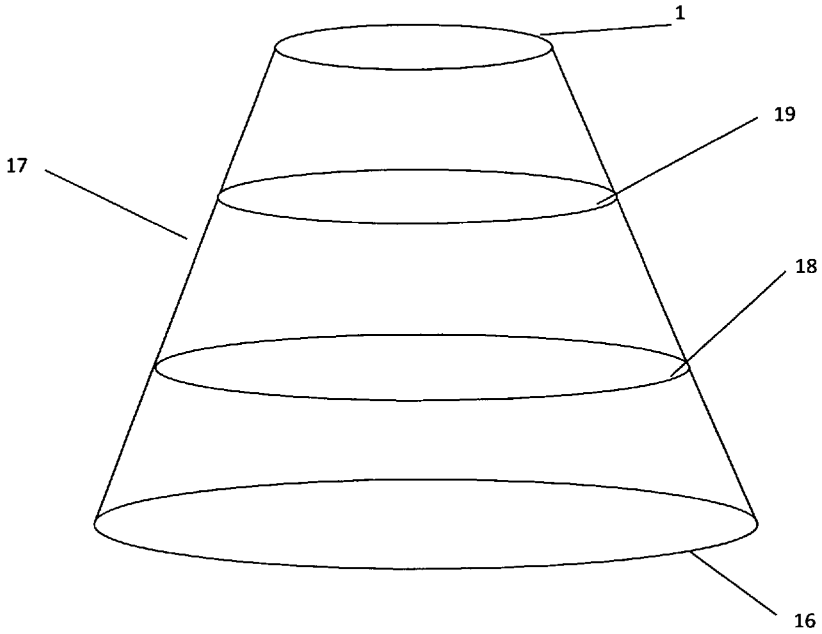

FIG. 6. A cross-sectional view of the bag of the single-use circular disposal garbage bag holder and bag with the round bottom the size and diameter of the circular cardboard base, and also a cross-sectional view of the bag of the single-use circular disposal garbage bag holder and bag with four plastic and aluminum rings in position equidistant from each other and attached to the inside or outside of the bag.

Figure 7:
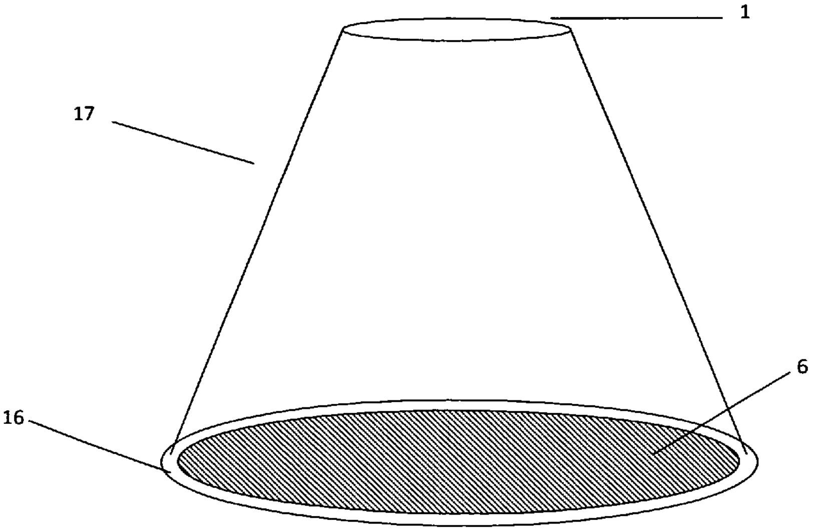

FIG. 7. A cross-sectional view of the bag of the single-use circular disposal garbage bag holder and bag device with the upper smallest plastic and aluminum ring in place and the bottom plastic and aluminum ring in place with the cardboard base in position and connected to the inside and outside of the bottom of the bag.

Figure 8:
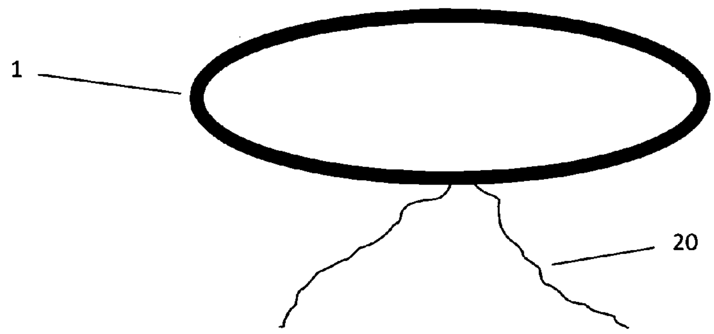

FIG. 8. A cross-sectional view of the upper most and more flexible plastic and aluminum ring with the tie-string positioned loosely within the ring and extending outside the ring for bag and device sealing and tying.

Figure 9:
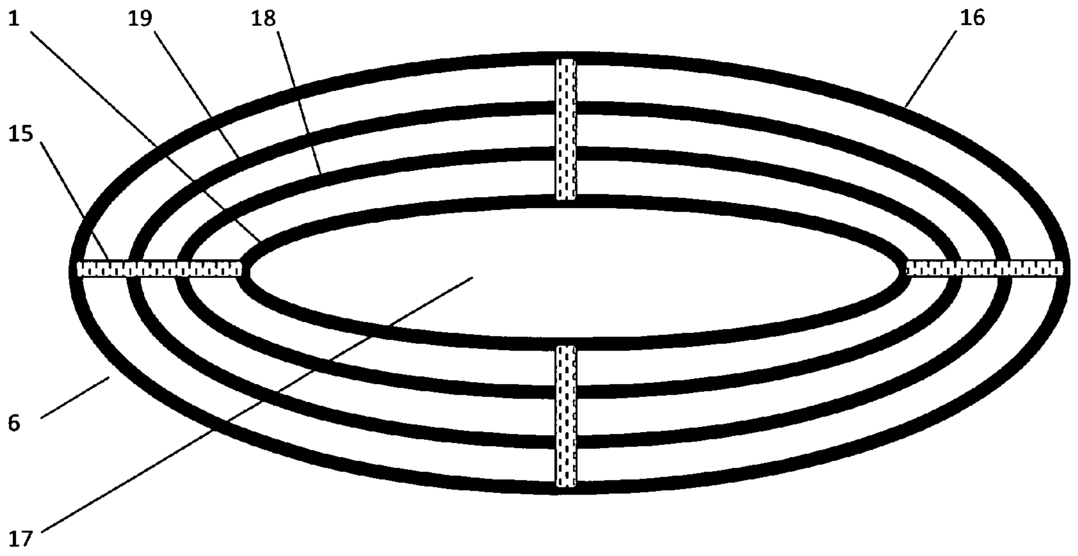

FIG. 9. A cross-sectional view of the collapsed and flattened and prior-to-use position of the device illustrating four plastic and aluminum rings, the folded up tri-folding locking connectors, the cardboard base on the bottom of the collapsed device and the center of the bag.

DETAILED DESCRIPTION OF THE INVENTION

Present methods of non-permanent garbage and trash bag holders and bags are in the form of metal and hard plastic holders generally of a square or rectangular shape, a square or rectangular vertically positioned cardboard box with a plastic or other bag positioned in the box, and methods with the appearance of indoor and permanent garbage and trash bag holders and bag methods. The present invention provides a garbage and trash disposal device mostly for areas lacking permanent and other garbage and trash disposal devices and includes a circular expandable single-use disposable garbage bag holder and bag.

The Figures depict the appearance of, and the manner in which the device is made. FIG. 1 depicts five increasingly larger light-weight plastic, polymer, metal, paper or cardboard rings, 1, positioned atop one another at equal distances apart. The rings are connected to each other and are held in position by the lock connectors, 2, which are positioned between each two rings shown by 3, and each lock connector between two rings is a three-piece folding and locking unit. When unfolded and locked as shown, the lock connectors for a straight rigid locking component of the device. The lock connectors are positioned along the entire vertical length of the device (four are show in the drawing) and the entire length of the lock connectors are positioned at equal distances around each ring. Each ring is connected firmly to the lock connectors at the intersection, 4, of the ring and the lock connectors for holding the rings in position and for sturdiness and vertical stability of the device. A tie-string may be made within the upper-most smallest ring and the upper-most ring may be more flexible for tying purposes. The lock connectors, 2, folds into three equal length, swiveling, stacking and locking positions.

The rings of the device are made such that the outside diameter of an upper or smaller ring will fit into the inside diameter of the next larger ring. Therefore, the device is made such that the rings stack in a flat manner when the device is collapsed and closed. This geometry also contributes to the ability of the device to stand up on its own.

The lowest and largest ring, 5, of the device is made to be very rigid and very sturdy. The lock connectors connected to the lowest and largest ring must be connected and locked in a very sturdy manner. The lowest and largest ring may be made heavier and larger than the other rings. A circular cardboard structure, 6, is made and attached onto, within, or about the lowest and largest ring.

The rings and lock connector structure in FIG. 1 is made to be positioned outside the surface of a plastic bag or is made to be positioned inside the surface of a plastic bag. And the device in FIG. 1 is made to include a circular cardboard structure connected to the inside or outside bottom of the plastic bag.

The device may be made as a circular-shaped, triangle-shaped, or multi-sided shaped device. The rings may be made curved edge or straight edge rings and the rings may also be made as a combination of both and multi-shaped structures.

FIG. 2 depicts five increasingly larger from top to bottom rings for the device which are made of light-weight plastic, aluminum, wood, polymer, rubber, paper, alloy, etc. The rings may be made of a solid or hollow nature and the top smallest ring may facilitate a tie-string component for sealing the device after use.

FIG. 3 depicts two to the device rings, 1, connected by a two straight rigid three-piece lock connector units. The lock connector units are attached firmly to each of the rings at junction and position 8. Each of the lock connector units is (two complete three-piece units are shown) made of three equal length swivel interlocking sections at junction and position 7. The lock connector units are foldable, stackable and collapsible when the device is closed. The lock connector units are expandable and lockable when the device is opened. The lock connector units are made of plastic or aluminum and are made of three separate individual units made into a single lock connector unit. The lock connector units lock in a straight rigid position when the device is expanded. The lock connector units fold into a single flat unit when the device is closed. The lock connector units are a single unit extending from the top of the ring of the device down to the base ring of the device. The external ends of the lock connectors are attached firmly to each ring locking the ring in place on the lock connector. The lock connector units include a locking swivel joint connection and each of the lock connectors locks itself onto adjacent lock connectors.

FIG. 4 depicts a. the top view of a single lock connector individual component, 9. The lock connector is made of plastic, aluminum, and other light-weight metals, polymers, plastic, wood, and other materials. The upper face of the lock connector is made with upward positioned, outward extending extrusions, 10, made to fit into the grooves and indentions on the underside of another lock connector. Each lock connector is made with a swivel and locking component, 12, at each end of the connector. FIG. 4 depicts b. the underside of a single lock connector individual component which is made with grooves and indentions, 11, into which the upward positioned, outward extending extrusions, 10, of another lock connector may fit and lock into place. FIG. 4 depicts c. three individual lock connector components, 13, connected at the locked swivel junction at the end of two adjoining connector units, 14. The three individual lock connector components shown in c. form a single, rigid and locked lock connector. FIG. 4 depicts the three individual lock connector components folded and stacked, 15 while connected at the swivel junction. The lock connector swivel junctions are made to connect the lock connector components together and to connect the lock connectors to the device rings, 1.

FIG. 5 depicts the outer edges of the lowest most and largest plastic ring, 16, on which or under which the circular cardboard structure, 6, is positioned. The circular cardboard structure is the base of the device.

FIG. 6 *a*. depicts the bag, 17, that the circular expandable single-use disposable garbage holder holds. The bag is shaped as that the inside diameters of the rings form when the device is expanded and opened. The bag is also shaped as that the outside diameters of the rings form when the device is expanded and opened. The size of the bag will vary depending on the size of the device. The size of the bag depends on the size of the circular expandable single-use disposable garbage holder. The bottom of the bag is the size of the inside or outside diameter of the lowest positioned and largest plastic ring, 16, or is the size of the circular cardboard structure, 6, or a combination of both. FIG. 6 *b*. depicts the bag, 17, with four plastic rings, 1, 19, 18, and 16, positioned at equal distances from each other and may be positioned on the inside of the bag, 17, or may be positioned on the outside of the bag, 17. The bag, 17, is connected to the rings using adhesion, tying, threading, melting and molding, clamping, hooking, binding, fitting, etc.

FIG. 7 depicts the bag, 17, with the upper-most and smallest plastic ring, 1, attached to the top of the bag. The top of the bag can be attached to the inside or outside diameter surface of the plastic ring, 1 providing the top of the bag is allowed a tie-string area just above the location and contact with the plastic ring. The bag is made of light-weight material including plastic, paper, polymer, rubber, etc. The bottom of the bag is positioned on and about the bottom most and largest plastic ring and may allow the outer edge of the lowest positioned and largest ring, 16, to be exposed. The outside base of the bag is positioned on and attached to the entire upper surface of the circular cardboard structure, 6. The inside base of the bag may also be attached to the entire bottom of the circular cardboard structure, 6.

FIG. 8 depicts the upper-most positioned and smallest plastic ring, 1, with the tie-string ends, 20, showing and the remainder of the tie-string somewhat loosely positioned inside the plastic ring, 1. The tie-string is used to seal and close the bag top after using the bag and when the bag is ready for disposal. The upper-most plastic ring may also be made more flexible than the remaining plastic rings in order for the pulling of the tie-string allows the top of the bag to be sealed and closed in a tight manner.

FIG. 9 depicts the collapsed, non-expanded, closed device providing a flat appearance prior to usage. The Figure shows the smallest plastic ring, 1, the next ring, 18, the next ring, 19 and the largest ring, 16 in a collapsed, stacked flattened position with the lock connector units, 15, connected to each of the plastic rings, tri-folded into a flat stack of three lock connector components. The plastic bag, 17, can be seen in the middle of the collapsed, non-expanded, closed device and the circular cardboard structure, 6, is positioned beneath the entire lock connector ring and bag structure.

The method of making a circular expandable single-use disposable garbage holder and bag device is comprised of making two, three or more light-weight circular plastic and aluminum rings positioned vertically equidistant from each other and separated by 0.1 m with said rings one atop the other increasing in size from top to bottom, and making said rings ranging in outside diameter from 0.3 m to 2 m including 0.3 m, 0.4 m, 0.5 m, 1 m, and 2 m and in height from 0.1 cm to 0.2 m and a width from $1\times10^{-7}$ to $1\times10^{0}$ and said rings are open in the center. The method includes making increasingly larger ring allowing the next smaller ring diameter to fit within said next larger ring diameter making said rings stackable into a flat stack. The method includes making a locking plastic, polymer, metal, paper, wood, or alloy mechanism which locks the lock itself and the rings into a predetermined position equal-length position from the next ring and the previous ring. The method includes making plastic indentions and grooves and lifted areas on said lock structures that fit into each other and lock into a firm position. The method includes making plastic, polymer, metal, paper, wood, or alloy locks located at least three equidistant positions on each ring and each lock is positioned in the same position and location on each ring. The method includes making three sections of said lock structures that are connected in sequence and the end joint connections of each said lock structures allows swivel and said three sections are stackable. The method includes making the lowest positioned and largest ring connected to a circular $1\times10^{-7}$ cm to $1\times10^{0}$ m thick and sturdy cardboard, paper, wood, plastic, polymer, rubber, or aluminum structure with a diameter equal to, just larger than, or just smaller than that of said outer diameter of said lowest positioned and largest ring. The method includes making external most ends of said plastic and aluminum lock structures attached firmly to each said ring and to the edges of said cardboard, paper, wood, plastic, polymer, rubber, or aluminum structure.

The method includes making a light-weight plastic bag with the shape and size of the inside diameters and shape of the expanded device and said bag is positioned inside said rings with the upper edge of said bag just beneath a tie-string area of the top of said bag positioned and connected to the inside diameter area of said upper-most and smallest ring. The method includes making a tie-string area on the inside of the upper-most and smallest ring. The method includes making a bag connected to the inside diameter surfaces of each subsequently positioned larger ring. The method includes making the entire lower surface of the bottom of said bag attached to the entire upper surface of said cardboard, paper, wood, plastic, polymer, rubber, or aluminum structure. The method includes making the edges of said circular cardboard structure attached firmly to said bottom or lowest-located plastic and aluminum ring. The method includes making the entire upper surface of the bottom of said bag attached to the entire lower surface of said cardboard structure. The method includes making the edge of said circular cardboard structure attached firmly to said bottom or lowest-located plastic and aluminum ring. The method includes making a light-weight plastic bag the shape and size of the outside diameter of the expanded device positioned outside the rings with the upper edge of said bag just beneath a tie-string area of the top of the bag positioned and connected to the outside diameter surface of said upper-most and smallest ring. The method includes making said tie-string area on the inside of the upper-most and smallest ring. The method includes making said bag connected to the outside surfaces of each subsequently positioned larger ring. The method includes making the entire surface of the bottom of said bag attached to the entire upper surface of said cardboard structure. The method includes making the edge of said circular cardboard structure attached firmly to said bottom or lowest-located plastic and aluminum ring. The method includes making the entire upper surface of the bottom of said bag is attached to the entire lower surface of said cardboard structure. The method includes making the edge of said circular cardboard structure attached firmly to said bottom or lowest-located plastic and aluminum ring.

The method includes making the device such that the rings connected by said lock structures and connected to said bag can collapse and become flat when the device is closed and flattened and said device is expandable and open when said device is expanded and opened. The method includes making said device such that the rings connected by said lock structures and connected to said bag can collapse and become flat when the device is closed and flattened and said device is expandable and open when said device is expanded and opened. The method includes making said device such that the upper-most ring may be held and the remainder of the device may be expanded and opened, spread out or thrown and snapped and locked into full expanded and opened position. The method includes making said device such that the upper-most ring may be held and the remainder of the device may be expanded and opened manually and spread out and locked into full expanded and opened position. The method includes making said device to tie and dispose of said entire device.

The invention claimed is:

1. A device for garbage collection comprising:

one or more garbage bags structurally supported by a holder, wherein said holder comprises rings with outside diameters ranging from 0.3 m to 2 m including 0.3 m, 0.4 m, 0.5 m, 1 m and 2 m and in height from 0.1 cm to 0.2 m and a width from $1\times10^{-7}$ to $1\times10^{0}$;

wherein said rings are operably connected in the order listed to one another from top to bottom by a three-piece equal length swivel interlocking collapsible lock connector with the upper face of each piece of said three-piece connector with upward positioned outward extending extrusions and indentions and grooves on the underside of each piece of said three-piece lock connector; and a bottom ring and lowest located said lock connector part attached to a circular cardboard structure;

wherein each three-piece swivel interlocking collapsible locking connector comprises;

three flat grooved indented, attached, equal-length plastic or aluminum members comprising an upper face with outward-extending extrusions and an under face with underside grooves and indentions operably connected to one another by at least one swivel joint.

2. The device of claim 1 wherein said rings are incremented by a fixed dimension.

3. The device of claim 2 wherein said three-piece swivel interlocking collapsible locking connector can be folded by said swivel joint to form a locking piece collapsed state or a locking piece open state.

4. The device of claim 3 wherein the width of said three-piece swivel interlocking collapsible locking connector when in said collapsed state is smaller than said fixed dimension between two or more said rings.

5. The device of claim 4 wherein said smallest ring operably attaches to a garbage bag.

6. The device of claim 5 additionally comprising a base which operably attaches to the largest of said rings.

7. The device of claim 6 wherein said base is disc shaped as is the largest ring of said rings and outside diameters ranging from 0.3 m to 2 m including 0.3 m, 0.4 m, 0.5 m, 1 m and 2 in.

8. The device of claim 7 wherein said largest ring has a larger thickness than any other said rings including in height from 0.1 cm to 0.2 m including 0.1 cm, 4.1 cm, 8.1 cm, 12.1 cm, 16.1 cm and 20.0 cm and a width from $1\times10^{-7}$ to $1\times10^{0}$ including $1\times10^{-7}$ m, $1\times10^{-5}$ m, $1\times10^{-3}$ m, $1\times10^{-1}$ m, and $1\times10^{0}$ m.

* * * * *